US012687221B2

(12) United States Patent
Inoue et al.

(10) Patent No.: US 12,687,221 B2
(45) Date of Patent: Jul. 21, 2026

(54) VEHICLE DRIVE DEVICE

(71) Applicant: AISIN CORPORATION, Kariya (JP)

(72) Inventors: Ryohei Inoue, Kariya (JP); Shinji Kondo, Kariya (JP)

(73) Assignee: AISIN CORPORATION, Kariya (JP)

( * ) Notice: Subject to any disclaimer, the term of this patent is extended or adjusted under 35 U.S.C. 154(b) by 445 days.

(21) Appl. No.: 18/266,762

(22) PCT Filed: Dec. 15, 2021

(86) PCT No.: PCT/JP2021/046279
§ 371 (c)(1),
(2) Date: Jun. 12, 2023

(87) PCT Pub. No.: WO2022/131291
PCT Pub. Date: Jun. 23, 2022

(65) Prior Publication Data
US 2024/0044399 A1 Feb. 8, 2024

(30) Foreign Application Priority Data
Dec. 18, 2020 (JP) ................................. 2020-209986

(51) Int. Cl.
*F16H 37/08* (2006.01)
*B60K 1/00* (2006.01)
(Continued)

(52) U.S. Cl.
CPC ........... *F16H 37/0813* (2013.01); *B60K 1/00* (2013.01); *B60K 17/165* (2013.01);
(Continued)

(58) Field of Classification Search
CPC .. F16H 37/0813; F16H 57/021; F16H 57/031; F16H 2057/02034; B60L 15/007; B60K 2001/001
See application file for complete search history.

(56) References Cited

U.S. PATENT DOCUMENTS 6,533,696 B1 3/2003 Takenaka et al.
11,137,061 B2 * 10/2021 Ishikawa ............. F16H 57/0441
(Continued)

FOREIGN PATENT DOCUMENTS

CN 103795183 A 5/2014
JP 2001-119810 A 4/2001
(Continued)

OTHER PUBLICATIONS

Apr. 26, 2024 extended Search Report issued in European Patent Application No. 21906652.9.
(Continued)

*Primary Examiner* — Brian L Swenson
(74) *Attorney, Agent, or Firm* — Oliff PLC

(57) ABSTRACT
A case includes: a case body forming a first housing chamber housing a rotating electrical machine and gears and a second housing chamber housing an inverter device; and a cover member. The cover member is joined to an axial second side of the case body, and disposed to cover the axial second side of the first housing chamber. The case body includes a partition wall separating the first housing chamber and the second housing chamber, a peripheral wall covering the first housing chamber from outside in a radial direction, and an axial wall covering an axial first side of the second housing chamber. The partition wall, the peripheral wall, and the axial wall are integrally formed.

12 Claims, 4 Drawing Sheets

(51) Int. Cl.

| | |
|---|---|
| *B60K 17/16* | (2006.01) |
| *B60L 15/00* | (2006.01) |
| *F16H 57/021* | (2012.01) |
| *F16H 57/031* | (2012.01) |
| *H02K 7/116* | (2006.01) |
| *H02K 11/33* | (2016.01) |
| *F16H 57/02* | (2012.01) |

(52) U.S. Cl.

CPC .......... *B60L 15/007* (2013.01); *F16H 57/021* (2013.01); *F16H 57/031* (2013.01); *H02K 7/116* (2013.01); *H02K 11/33* (2016.01); *B60K 2001/001* (2013.01); *F16H 2057/02034* (2013.01); *F16H 2057/02052* (2013.01)

(56) References Cited

U.S. PATENT DOCUMENTS

| | | | | |
|---|---|---|---|---|
| 2009/0213564 | A1 | 8/2009 | Kakuda et al. | |
| 2010/0222171 | A1* | 9/2010 | Tabata .................... | B60L 50/16 |
| | | | | 475/5 |
| 2013/0119793 | A1* | 5/2013 | Hofkirchner ......... | H02K 5/203 |
| | | | | 310/54 |

| | | | | |
|---|---|---|---|---|
| 2016/0072361 | A1 | 3/2016 | Kuramochi et al. | |
| 2016/0185232 | A1 | 6/2016 | Suzuki et al. | |
| 2020/0106325 | A1 | 4/2020 | Okuhata | |
| 2022/0111740 | A1* | 4/2022 | Inoue ..................... | F16H 48/08 |
| 2023/0113748 | A1* | 4/2023 | Inoue ..................... | H02K 9/193 |
| | | | | 310/54 |
| 2023/0406082 | A1* | 12/2023 | Inoue ................... | F16H 57/021 |
| 2024/0039365 | A1* | 2/2024 | Ito .......................... | H02K 7/003 |
| 2024/0088743 | A1* | 3/2024 | Ito .......................... | H02K 5/225 |
| 2024/0333100 | A1* | 10/2024 | Matsuzaki .............. | H02K 9/19 |

FOREIGN PATENT DOCUMENTS

| | | | |
|---|---|---|---|
| JP | 2015-067221 | A | 4/2015 |
| JP | 2017-193264 | A | 10/2017 |
| JP | 2017-229174 | A | 12/2017 |
| JP | 2020-054185 | A | 4/2020 |
| WO | 2020/203909 | A1 | 10/2020 |
| WO | 2020/230749 | A1 | 11/2020 |

OTHER PUBLICATIONS

Mar. 1, 2022 International Search Report issued in International Patent Application No. PCT/JP2021/046279.

* cited by examiner

VEHICLE DRIVE DEVICE

TECHNICAL FIELD

The present disclosure relates to a vehicle drive device including a rotating electrical machine, a plurality of gears, a differential gear mechanism, an inverter device, and a case.

BACKGROUND ART

Japanese Unexamined Patent Application Publication No. 2017-229174 (JP 2017-229174 A) discloses an electromechanical integrated unit (1) including a rotating electrical machine (3), a speed reducer (11), and an inverter device (4) (signs in parentheses in the section "BACKGROUND ART" are those in the referenced document). The speed reducer (11) is a transmission mechanism that transmits a driving force of the rotating electrical machine (3) to wheels. The rotating electrical machine (3) and the inverter device (4) are housed in a common housing (2) that is a single-piece housing composed of a rotating electrical machine housing portion (21) and an inverter housing portion (22). The speed reducer (11) is housed in a speed reducer housing (11a) separate from the common housing (2). The inverter device (4) is housed in the inverter housing portion (22) located above the rotating electrical machine housing portion (21) that houses the rotating electrical machine (3). The common housing (2) is joined on one side in the axial direction (X direction) to the speed reducer housing (11a), and is joined on the other side in the axial direction to an end plate (10).

RELATED ART DOCUMENTS

Patent Documents

Patent Document 1: Japanese Unexamined Patent Application Publication No. 2017-229174 (JP 2017-229174 A)

SUMMARY OF THE DISCLOSURE

Problem to be Solved by the Invention

In the electromechanical integrated unit, the axial size of the inverter housing portion is limited by the mating surface between the common housing and the speed reducer housing and the mating surface between the common housing and the end plate. In other words, the layout of the housing chamber that houses the inverter depends on the dividing surfaces of the case of the vehicle drive device. Moreover, the case has the mating surfaces on both sides in the axial direction. This increases the required number of fastening members for fixing the case and the required number of sealing members for sealing the case, which may result in an increase in size and cost of the vehicle drive device.

In view of the above, it is desired to implement a technique that can reduce the size and manufacturing cost of a vehicle drive device.

Means for Solving the Problem

In view of the above, a vehicle drive device includes: a rotating electrical machine; a plurality of gears located in a power transmission path from the rotating electrical machine; a differential gear mechanism that distributes a driving force transmitted from the rotating electrical machine via the plurality of gears to a plurality of wheels; an inverter device that drives and controls the rotating electrical machine; and a case. With an axial direction being a direction along a rotation axis of the rotating electrical machine, the case includes a case body that forms a first housing chamber housing the rotating electrical machine and the plurality of gears and a second housing chamber housing the inverter device, and a cover member joined to the case body in the axial direction to close the first housing chamber. With an axial first side being a side in the axial direction on which the rotating electrical machine is located with respect to the plurality of gears, and an axial second side being an opposite side to the axial first side, the cover member is bonded to the axial second side of the case body and located so as to cover the axial second side of the first housing chamber. The case body includes a partition wall that separates the first housing chamber and the second housing chamber, a peripheral wall that covers the first housing chamber from outside in a radial direction, and an axial wall that covers the axial first side of the first housing chamber, and the partition wall, the peripheral wall, and the axial wall are integrally formed.

According to this configuration, since a joint surface between the case body and the cover member is located only on one side in the axial direction, it is easier to form the second housing chamber that is large in the axial direction. It is therefore easier to secure a large space in the axial direction for placing the inverter device. This reduces an increase in size of the second housing chamber in a direction orthogonal to the axial direction (e.g., up-down direction), and thus reduces an increase in size of the vehicle drive device. Moreover, the case body that forms the first housing chamber and the second housing chamber is integrally formed, and the first housing chamber can be formed by the case body and the cover member. Therefore, the number of components constituting the case can be reduced. That is, according to this configuration, it is possible to reduce the size and manufacturing cost of the vehicle drive device.

Further features and advantages will become apparent from the following description of an illustrative and non-limiting embodiment that will be given with reference to the drawings.

MODES FOR CARRYING OUT THE DISCLOSURE

Figure 1:
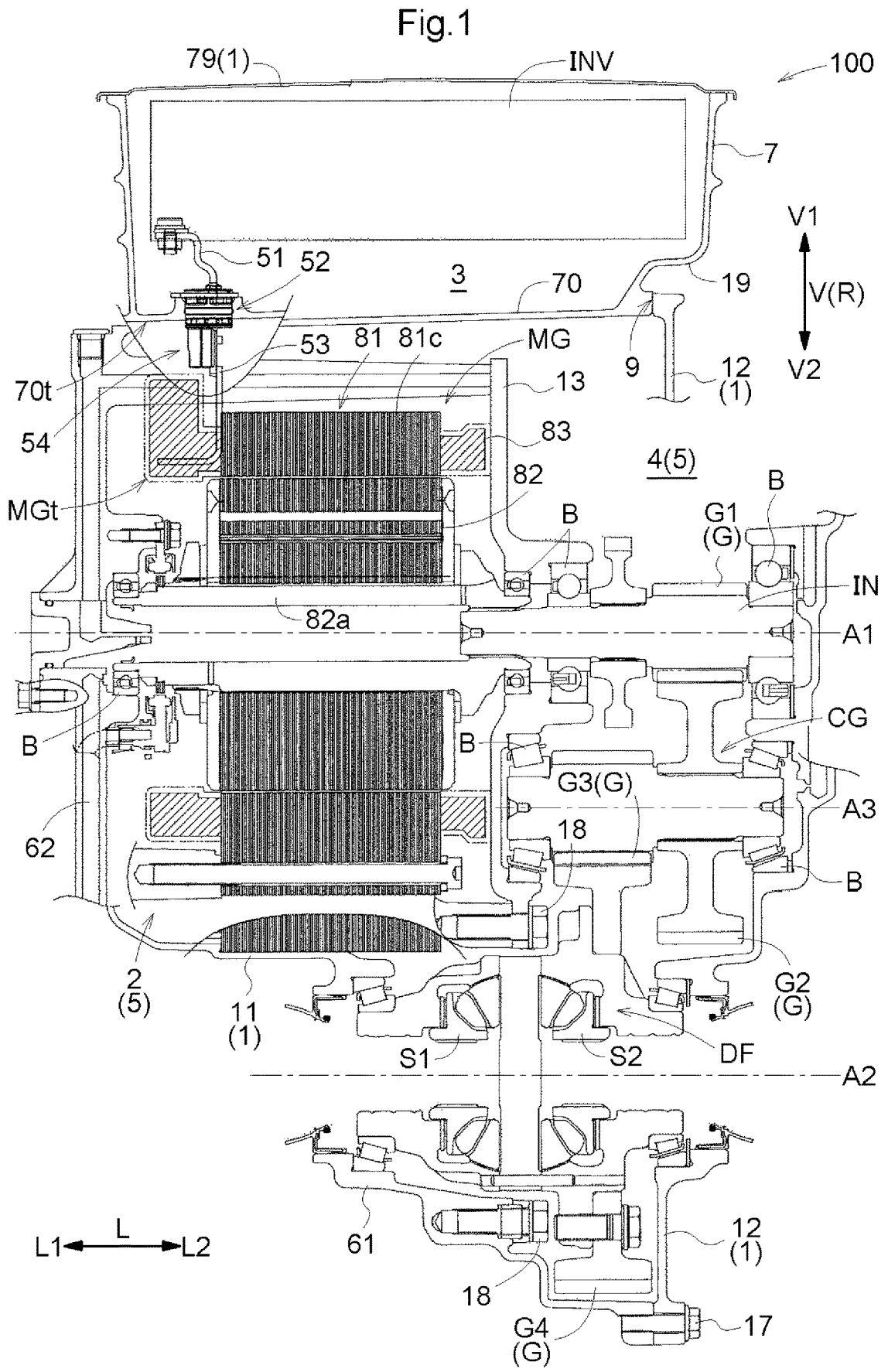
FIG. 1 is an axial sectional view of a vehicle drive device.
Figure 2:
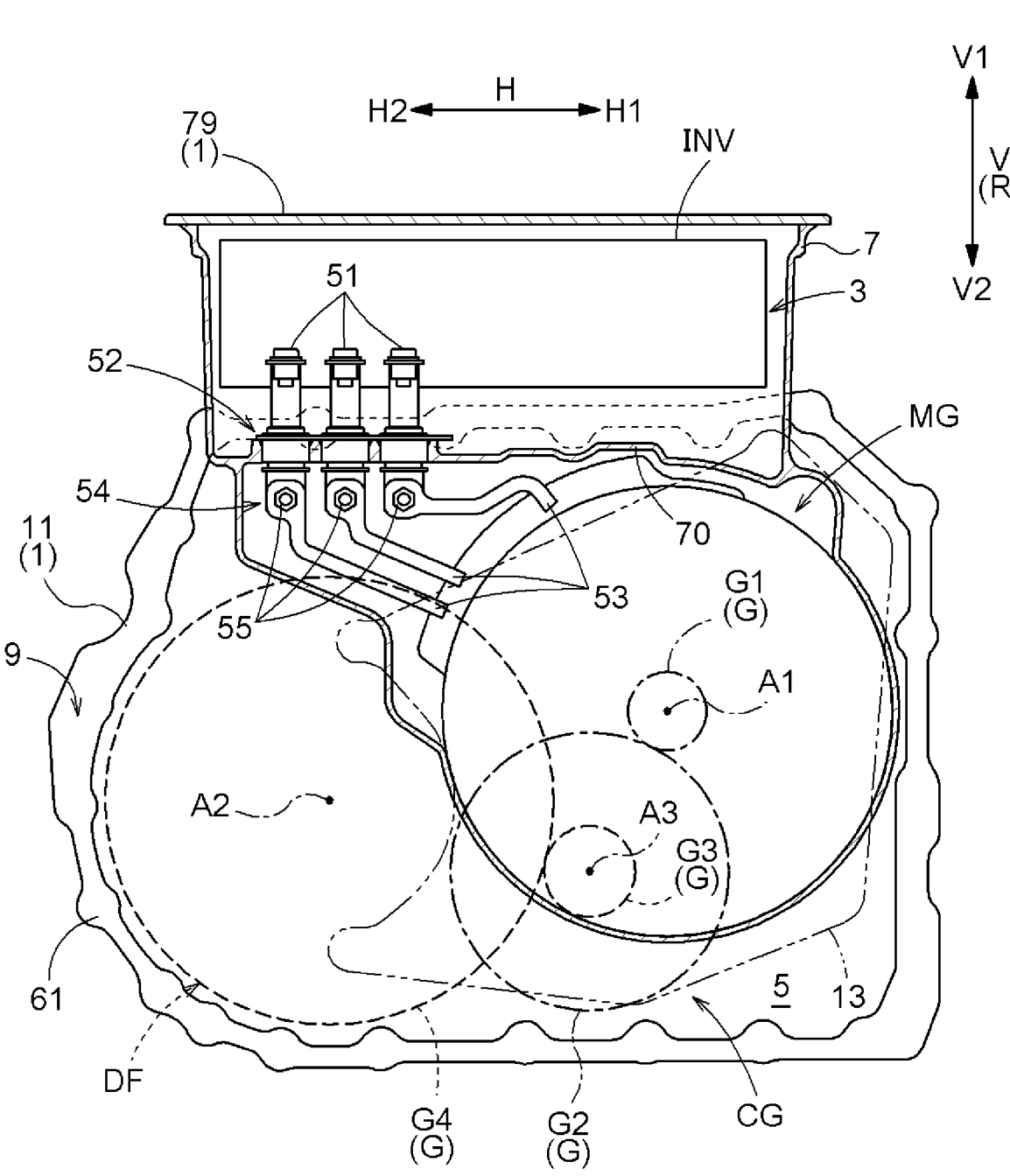
FIG. 2 is a diagram of the vehicle drive device as viewed in the axial direction.
Figure 3:
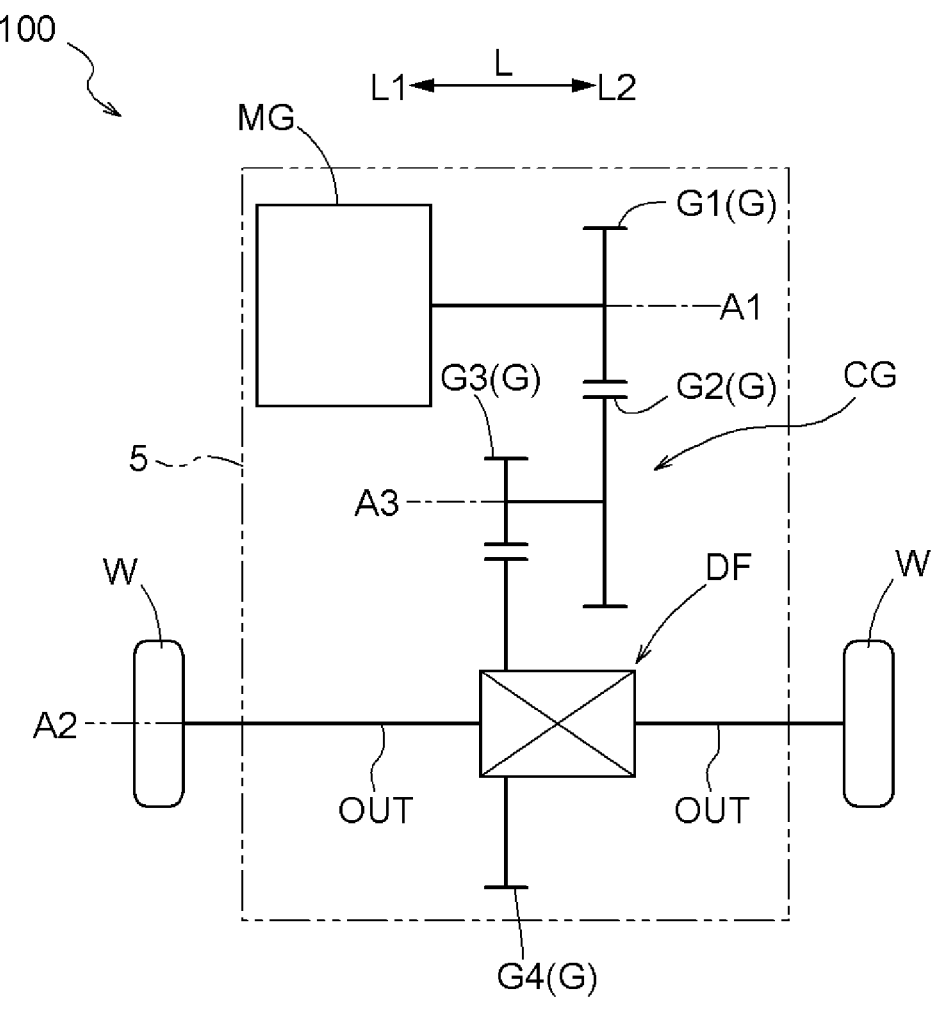
FIG. 3 is a skeleton diagram of the vehicle drive device.

Hereinafter, an embodiment of the present disclosure will be described with reference to the drawings. As shown in FIGS. 1 to 3, a vehicle drive device 100 includes: a rotating electrical machine MG located on a first axis A1; output members OUT located on a second axis A2 that is an axis different from and parallel to the first axis A1, and drivingly connected to wheels W; a plurality of gears G that is provided in a power transmission path from the rotating electrical machine MG and to which a driving force from the rotating electrical machine MG is transmitted; and a differential gear mechanism DF that distributes the driving force transmitted from the rotating electrical machine MG via the plurality of gears G to the wheels. The output members OUT are not shown in the sectional view of FIG. 1. The plurality of gears G also includes gears forming a counter gear mechanism CG. The counter gear mechanism CG is located on a third axis A3 that is an axis different from and parallel to the first axis A1 and the second axis A2. In the vehicle drive device 100, the plurality of gears G including the counter gear mechanism CG and the differential gear mechanism DF are arranged in this order from the rotating electrical machine MG side in the power transmission path connecting the rotating electrical machine MG serving as a power generation device and the wheels W.

As described above, the axis of the rotating electrical machine MG (first axis A1) and the axis of the output members OUT (second axis A2) are axes different from and parallel to each other. The axis of the differential gear mechanism DF is also the second axis A2. The axis of the counter gear mechanism CG (third axis A3) is parallel to the first axis A1 and the second axis A2. That is, the first axis A1, the second axis A2, and the third axis A3 are imaginary axes different from each other, and are parallel to each other.

In the following description, the direction parallel to the first axis A1 will be referred to as "axial direction L". Since the first axis A1 and the second axis A2 are parallel to each other, the axial direction L is also parallel to the second axis A2. Since the third axis A3 is parallel to the first axis A1 and the second axis A2, the axial direction L is also parallel to the third axis A3. One side in the axial direction L (in the present embodiment, the side on which the rotating electrical machine MG is disposed with respect to the plurality of gears G) will be referred to as "axial first side L1," and the opposite side thereof will be referred to as "axial second side L2."

The direction orthogonal to each of the first axis A1, the second axis A2, and the third axis A3 will be referred to as "radial direction R" with respect to each axis. When it is not necessary to distinguish which axis is used as a reference, or when it is clear which axis is used as a reference, the direction may be simply referred to as "radial direction R". The direction along the vertical direction when the vehicle drive device 100 is mounted on the vehicle is defined as "up-down direction V". In the present embodiment, a first side V1 in the up-down direction that is one side in the up-down direction V is an upper side, and a second side V2 in the up-down direction that is the other side in the up-down direction V is a lower side. When the vehicle drive device 100 is mounted on the vehicle so as to be parallel to a horizontal plane, one direction of the radial direction R matches the up-down direction V.

The direction orthogonal to the axial direction L and the up-down direction V will be referred to as "width direction H". One side in the width direction H will be referred to as "first side H1 in the width direction," and the other side in the width direction H will be referred to as "second side H2 in the width direction". As with the up-down direction V, one direction of the radial direction R matches the width direction H. In the following description, terms related to the direction, position, etc. of each member represent concepts that include a state in which there is a difference due to a manufacturing tolerance. The direction of each member represents the direction of the member when mounted in the vehicle drive device 100. In the present embodiment, the width direction H corresponds to the longitudinal direction of the vehicle when the vehicle drive device 100 is mounted on the vehicle. FIG. 2 shows a section of a mating surface between a case body 11 and a cover member 12 and a fastening portion 54 as viewed from the axial second side L2 (the case body 11, the cover member 12, and the fastening portion 54 will be described later).

The vehicle drive device 100 includes: an inverter device INV that drives and controls the rotating electrical machine MG; and a case 1 that houses the rotating electrical machine MG, the plurality of gears G, the differential gear mechanism DF, and the inverter device INV (see FIGS. 1 and 2). The case 1 includes the case body 11 that forms a device housing chamber 5 (first housing chamber) that houses the rotating electrical machine MG and the plurality of gears G and an inverter housing chamber 3 (second housing chamber) that houses the inverter device INV. The case 1 includes: the cover member 12 that is joined to the case body 11 in the axial direction L and closes the device housing chamber 5; and a partition member 13 that is located inside the device housing chamber 5 and fixed to the case body 11. The device housing chamber 5 also houses the differential gear mechanism DF and part of the output members OUT. The device housing chamber 5 and the inverter housing chamber 3 are separated by a partition wall 70 that will be described later. The device housing chamber 5 is formed as a space surrounded by the cover member 12 and the partition wall 70 of the case body 11. The case body 11 includes: the partition wall 70 that separates the device housing chamber 5 and the inverter housing chamber 3; a peripheral wall 61 that covers the device housing chamber 5 from outside in the radial direction R; and an axial wall 62 that covers the axial first side L1 of the device housing chamber 5. The partition wall 70, the peripheral wall 61, and the axial wall 62 are integrally formed. As used herein, the expression "integrally formed" refers to a single-piece member made of the same material and formed as, for example, a single die casting.

The inverter housing chamber 3 is formed as a space surrounded by side walls 7 standing from the partition wall 70 in the up-down direction V, a cover member 79 joined to the ends on the first side V1 in the up-down direction of the side walls 7, and the partition wall 70 of the case body 11. The partition wall 70 separates the device housing chamber 5 and the inverter housing chamber 3 in the up-down direction V.

Figure 4:
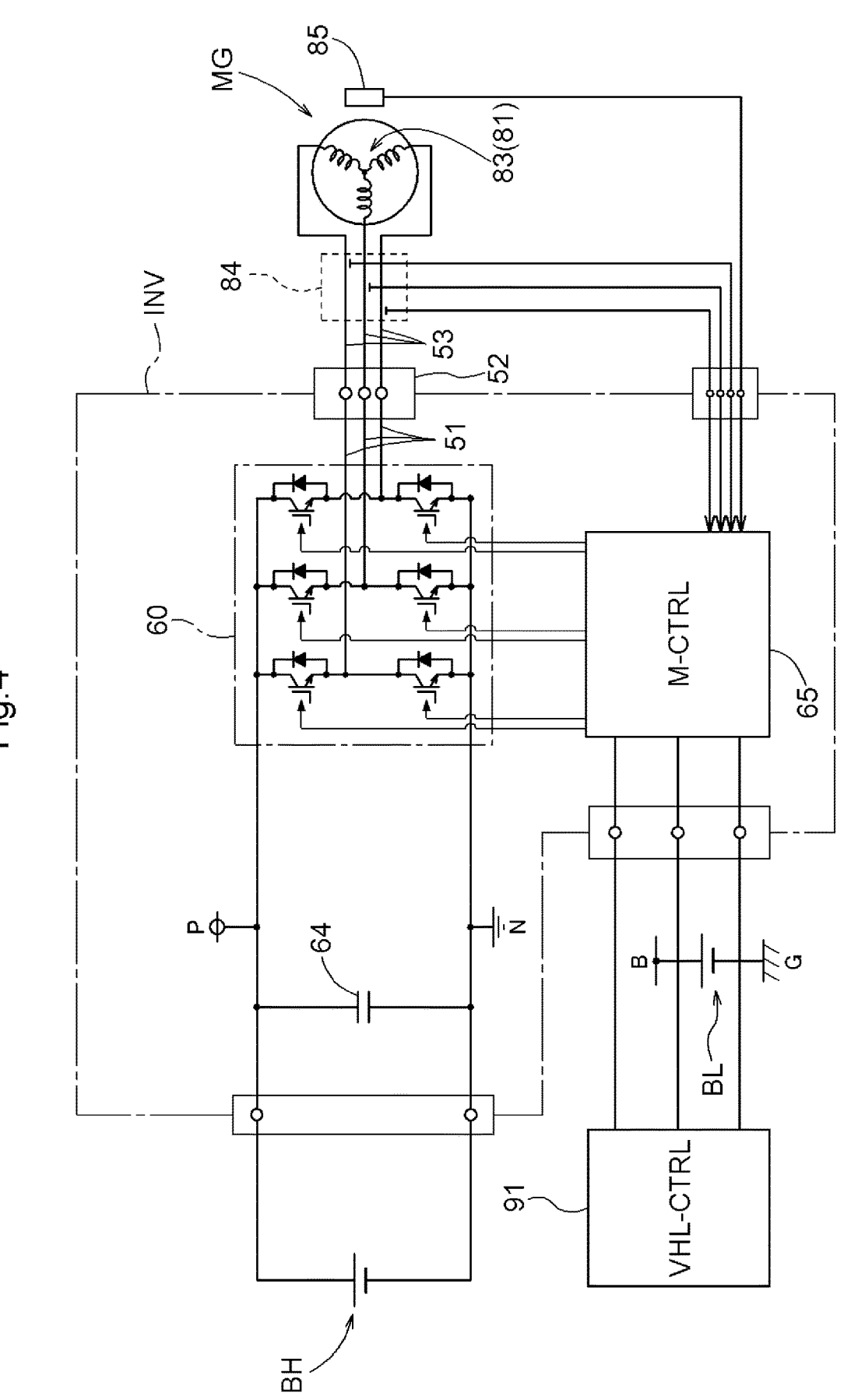
FIG. 4 is a schematic circuit block diagram of an electrical system for driving a rotating electrical machine.

The rotating electrical machine MG is a rotating electrical machine (motor/generator) that runs on multi-phase alternating current (e.g., three-phase alternating current), and can function as both an electric motor and a generator. As shown in FIG. 4, the rotating electrical machine MG receives power supply from a high-voltage battery BH (high-voltage direct current power source) to perform power running, or supplies (regenerates) power generated by the inertial force of the vehicle to the high-voltage battery BH.

The rotating electrical machine MG includes a stator 81 fixed to the case 1 etc., and a rotor 82 rotatably supported radially inside the stator 81. The stator 81 includes a stator core 81c and a stator coil 83 wound around the stator core 81c, and the rotor 82 includes a rotor core and permanent magnets disposed in the rotor core. The rotor 82 of the rotating electrical machine MG is drivingly connected to an input gear G1. The input gear G1 is one of the plurality of gears G that transmits the driving force from the rotating electrical machine MG to the differential gear mechanism DF, and corresponds to a first gear connected to the rotor 82 of the rotating electrical machine MG so as to rotate with the rotor 82. The input gear G1 is drivingly connected to the counter gear mechanism CG. More specifically, the input gear G1 meshes with a counter driven gear G2 (third gear) of the counter gear mechanism CG.

As shown in FIGS. 1 to 3, the counter gear mechanism CG is located on the third axis A3 parallel to the first axis A1 and the second axis A2, and drivingly connects the rotating electrical machine MG and the differential gear mechanism DF via the input gear G1. In the present embodiment, the third axis A3 on which the counter gear mechanism CG is disposed is located, in the up-down direction V, below (on the second side V2 in the up-down direction of) an imaginary plane connecting the first axis A1 and the second axis A2 (see FIG. 2).

The counter gear mechanism CG includes two gears connected by a shaft member (counter driven gear G2 and counter drive gear G3). That is, the counter gear mechanism CG includes: the counter driven gear G2 (third gear) that is located on the third axis A3 and meshes with the input gear G1 (first gear); and the counter drive gear G3 (fourth gear) that rotates with the counter driven gear G2 and meshes with a differential input gear G4 (second gear) that will be described later. In the present embodiment, the counter drive gear G3 (fourth gear) is disposed closer to the rotating electrical machine MG in the axial direction L than the counter driven gear G2 (third gear).

However, the configuration in which the counter driven gear G2 (third gear) is disposed closer to the rotating electrical machine MG in the axial direction L than the counter drive gear G3 (fourth gear) is not excluded. The configuration in which the third axis A3 on which the counter gear mechanism CG is disposed is located, in the up-down direction V, above (on the first side V1 in the up-down direction of) the imaginary plane connecting the first axis A1 and the second axis A2 is also not excluded.

The differential gear mechanism DF is drivingly connected to the wheels W via the output members OUT. The differential gear mechanism DF includes a plurality of bevel gears meshing with each other, and transmits rotation and torque input to the differential input gear G4 (second gear) so that the rotation and torque are distributed to the pair of output members OUT (i.e., the pair of wheels W) via a first side gear S1 and a second side gear S2. The differential input gear G4 connected to the differential gear mechanism DF so as to rotate with the differential gear mechanism DF is one of the plurality of gears G that transmits the driving force from the rotating electrical machine MG to the differential gear mechanism DF. The differential input gear G4 is connected to the differential gear mechanism DF and transmits the driving force from the rotating electrical machine MG to the differential gear mechanism DF. The differential gear mechanism DF distributes the driving force of the rotating electrical machine MG transmitted thereto via the differential input gear G4 to the two output members OUT. The vehicle drive device 100 can thus transmit the torque of the rotating electrical machine MG to the wheels W to move the vehicle. It should be understood that the first side gear S1 and the second side gear S2 are included in the differential gear mechanism DF and are not included in the output members OUT.

As described above, the partition member 13 structured as a separate member is fixed to the case body 11 so as to partition the device housing chamber 5. With the partition member 13, a rotating electrical machine housing chamber 2 and a gear housing chamber 4 can appropriately be formed in the integrally formed case body 11. The number of components of the case 1 can be thus reduced compared to a form including a case member having the rotating electrical machine housing chamber 2 and a case member having the gear housing chamber 4. The partition member 13 also serves as a support member that supports the rotating electrical machine MG, an input member IN, and the counter gear mechanism CG.

As shown in FIG. 1, a rotor shaft 82a of the rotating electrical machine MG is rotatably supported by bearings B on both the axial first side L1 and the axial second side L2. The bearing B on the axial first side L1 is supported by the case body 11, and the bearing B on the axial second side L2 is supported by the partition member 13. The input member IN connected to the rotor shaft 82a is supported by the partition member 13 via a bearing B on the axial first side L1, and is supported by the cover member 12 via a bearing B on the axial second side L2. Similarly, the counter gear mechanism CG is supported by the partition member 13 via a bearing B on the axial first side L1, and is supported by the cover member 12 via a bearing B on the axial second side L2. Since the partition member 13 thus serves as a support member, there is no need to separately provide a space for placing a support member in the device housing chamber 5. This reduces an increase in size of the vehicle drive device 100.

As shown in FIG. 4, the rotating electrical machine MG is driven and controlled by the inverter device INV. The inverter device INV is also housed in the case 1 (case body 11). The inverter device INV includes an inverter circuit 60 that converts power between direct current power and multiphase alternating current power. The inverter circuit 60 is connected to the alternating-current rotating electrical machine MG and the high-voltage battery BH, and converts power between direct current and multi-phase alternating current (in this example, three phases that are U-phase, V-phase, and W-phase). The high-voltage battery BH is, for example, a secondary battery (battery) such as a nickel-metal hydride battery or a lithium-ion battery, or an electric double layer capacitor. When the rotating electrical machine MG is the driving force source of the vehicle, the high-voltage battery BH is a high voltage, high capacity direct current power source, and the rated power supply voltage is, for example, 200 to 400 [V]. The inverter circuit 60 includes a direct current link capacitor 64 (smoothing capacitor) that smooths the voltage between a direct current positive power supply line P and a direct current negative power supply line N (direct current link voltage). The direct current link capacitor 64 stabilizes the direct current link voltage that fluctuates according to fluctuations in power consumption of the rotating electrical machine MG.

The inverter circuit 60 includes a plurality of switching elements. Specifically, the inverter circuit 60 includes a plurality of (in this example, three) arms for single-phase alternating currents, each arm being a series circuit of an upper switching element and a lower switching element. It is suitable to apply a power semiconductor element capable of operating at a high frequency, such as an insulated gate bipolar transistor (IGBT), a power metal oxide semiconductor field effect transistor (power MOSFET), a silicon carbide-metal oxide semiconductor FET (SiC-MOSFET), an SiC-static induction transistor (SiC-SIT), or a gallium nitride-MOSFET (GaN-MOSFET), to the switching elements. As shown in FIG. 4, the present embodiment illustrates a form in which IGBTs are used as the switching elements. In the present embodiment, the inverter circuit 60 including freewheeling diodes is integrated into one power module to form a switching element module.

As shown in FIG. 4, the inverter circuit 60 is controlled by an inverter control device 65 (M-CTRL). The inverter control device 65 is constructed using a logic circuit such as a microcomputer as a core member. The inverter control device 65 performs, based on target torque of the rotating electrical machine MG, current feedback control using a known vector control method, and thus controls the rotating electrical machine MG via the inverter circuit 60. For example, the target torque of the rotating electrical machine MG is provided as a request signal from other control device such as a vehicle control device 91 (VCL-CTRL) that is one of higher-level control devices in the vehicle. An actual current flowing through the stator coil 83 of each phase of the rotating electrical machine MG is detected by a current sensor 84. The magnetic pole position of the rotor of the rotating electrical machine MG at each point in time is detected by a rotation sensor 85 such as a resolver.

The inverter control device 65 performs the current feedback control using the detection results from the current sensor 84 and the rotation sensor 85. The inverter control device 65 includes various functional units for the current feedback control, and each of the functional units is implemented by cooperation between hardware such as a microcomputer and software (program).

The vehicle control device 91 and the inverter control device 65 are low-voltage circuits that run on power supplied from a low-voltage battery BL (low-voltage direct current power source) that is a power source with a lower voltage (e.g., 12 to 24 [V]) than the high-voltage battery BH. Therefore, the inverter control device 65 includes a drive circuit that increases the driving capacity (e.g., capacity to operate a subsequent circuit, such as a voltage amplitude and an output current) of a switching control signal for each switching element (gate drive signal in the case of an IGBT) and relays the switching control signal. The inverter control device 65 is structured by mounting the above microcomputer, its peripheral circuits, and circuit components of the drive circuit on one or more substrates.

The inverter device INV is structured as a unit including the inverter control device 65, the direct current link capacitor 64, and the inverter circuit 60 (power module) that are described above. The inverter device INV as a unit is disposed in the inverter housing chamber 3 (second housing chamber) and is fixed to the case 1 with fastening members such as bolts. As used herein, the expression "overlap the inverter device INV" refers to overlapping one or more of the constituent elements of the inverter device INV.

As described above, the vehicle drive device 100 of the present embodiment includes: the rotating electrical machine MG; the plurality of gears G provided in the power transmission path from the rotating electrical machine MG; the differential gear mechanism DF that distributes the driving force transmitted from the rotating electrical machine MG via the plurality of gears G to the plurality of wheels W; the inverter device INV that drives and controls the rotating electrical machine MG; and the case 1. The case 1 includes: the case body 11 integrally formed so as to form the device housing chamber 5 (first housing chamber) that houses the rotating electrical machine MG and the plurality of gears G and the inverter housing chamber 3 (second housing chamber) that houses the inverter device INV; the cover member 12 joined to the case body 11 in the axial direction L to close the device housing chamber 5; and the partition member 13 located inside the device housing chamber 5 and fixed to the case body 11. The partition member 13 partitions the device housing chamber 5 in the axial direction L into the rotating electrical machine housing chamber 2 that houses the rotating electrical machine MG and the gear housing chamber 4 that houses the plurality of gears G. As shown in FIG. 2, the partition member 13 extends in the width direction H. The partition member 13 is a separate member from the case body 11, and is fixed to the case body 11 with partition member fastening members 18. As shown in FIG. 2, the partition member 13 extends in the width direction H. In other words, the partition member 13 is in the form of a plate extending in the radial direction R.

The cover member 12 is joined to the axial second side L2 of the case body 11, and is disposed so as to cover the axial second side L2 of the gear housing chamber 4. The cover member 12 is joined to the case body 11 at a joint surface 9, and is fixed to the case body 11 by cover member fastening members 17. The case body 11 includes: the peripheral wall 61 that covers the rotating electrical machine housing chamber 2 from outside in the radial direction R; and the axial wall 62 that covers the axial first side L1 of the rotating electrical machine housing chamber 2. The peripheral wall 61 and the axial wall 62 are integrally formed. The end on the axial first side L1 of the partition wall 70 of the case body 11 that separates the device housing chamber 5 and the inverter housing chamber 3 (axial first side-end 70t of the partition wall) is located on the axial first side L1 with respect to the end on the axial first side L1 of the rotating electrical machine MG (axial first side-end MGt of the rotating electrical machine). The axial first side-end MGt of the rotating electrical machine is the end on the axial first side L1 of a coil end portion of the stator coil 83 of the rotating electrical machine MG.

Since the joint surface 9 between the case body 11 and the cover member 12 is located only on one side in the axial direction L, it is easier to form the inverter housing chamber 3 that is large in the axial direction L. It is therefore easier to secure a large space in the axial direction L for placing the inverter device INV. This reduces an increase in size of the inverter housing chamber 3 in a direction orthogonal to the axial direction L (e.g., the up-down direction V), and thus reduces an increase in size of the vehicle drive device 100. Moreover, the case body 11 is integrally formed so as to form the device housing chamber 5 and the inverter housing chamber 3, and the device housing chamber 5 can be formed by the case body 11 and the cover member 12. Therefore, the number of components constituting the case 1 can be reduced.

The rotating electrical machine housing chamber 2 and the gear housing chamber 4 are not completely separated by the partition member 13, but partially communicate with each other. The rotating electrical machine housing chamber 2 is formed with the rotating electrical machine MG disposed on the axial first side L1 of the partition member 13, and the gear housing chamber 4 is formed with the plurality of gears G disposed on the axial second side L2 of the partition member 13.

As described above, the device housing chamber 5 includes the rotating electrical machine housing chamber 2 that houses the rotating electrical machine MG, and the gear housing chamber 4 that houses the plurality of gears G. The case 1 includes the partition member 13 disposed between the rotating electrical machine housing chamber 2 and the gear housing chamber 4 in the axial direction L and fixed to the case body 11. With the partition member 13, the plurality of housing chambers is appropriately formed in the integrally formed case body 11.

The rotor 82 of the rotating electrical machine MG is supported by the axial wall 62 and the partition member 13. That is, the rotor 82 is supported on the axial first side L1 by the axial wall 62 serving as a support wall, and is supported on the axial second side L2 by the partition member 13 serving as a support wall. The rotor 82 is thus appropriately supported by the strong support walls constituting the case 1.

As described above, the end of the partition wall 70 on the axial first side L1 (axial first side-end 70$t$ of the partition wall) is located on the axial first side with respect to the end of the stator 81 of the rotating electrical machine MG on the axial first side L1 (end of the stator core 81$c$ or end of the coil end portion of the stator coil 83). Similarly, the end of the partition wall 70 on the axial first side L1 (axial first side-end 70$t$ of the partition wall) is located on the axial first side with respect to the end of the rotor 82 of the rotating electrical machine MG on the axial first side L1 (end of the rotor core). That is, it is possible to form the inverter housing chamber 3 that is large in the axial direction L, which makes it easier to secure a space in the axial direction L for placing the inverter device INV.

The space in the axial direction L where the partition wall 70 is placed is located so as to overlap the space in the axial direction L where the partition member 13 is placed. That is, the partition wall 70 extends across the partition member 13 in the axial direction L. Since the partition wall 70 extends across the partition member 13 in the axial direction L, it is easy to ensure the rigidity of the device housing chamber 5, the rigidity of the inverter housing chamber 3, and the rigidity of the partition wall 70. As used herein, regarding the arrangement of two members, the "spaces in a specific direction where two members are placed overlap each other" means that at least part of each of the two members is present at the same position in the specific direction.

It should be understood that when, for example, it is ensured that the device housing chamber 5, the inverter housing chamber 3, the partition wall 70, etc. have sufficient rigidity, the space in the axial direction L where the partition wall 70 is placed need not necessarily overlap the space in the axial direction L where the partition member 13 is placed.

The space in the axial direction L where the partition wall 70 is placed is located so as to overlap the space in the axial direction L where at least part of the plurality of gears G is placed. By placing the partition wall 70 in this manner, the inverter housing chamber 3 can be formed over a large area in the axial direction L. That is, since the partition wall 70 is also located above the gear housing chamber 4, it is possible to form the inverter housing chamber 3 that is sufficiently large in the axial direction L. It should be understood that, when it is possible to form a sufficiently large inverter housing chamber 3, the space in the axial direction L where the partition wall 70 is placed need not necessarily overlap the space in the axial direction L where the gears G are placed.

Inverter-side busbars 51 electrically connected to the inverter circuit 60 and rotating electrical machine-side busbars 53 electrically connected to the stator coil 83 are electrically connected to each other by a connection member 52 such as a connector. The inverter circuit 60 and the rotating electrical machine MG are thus electrically connected to each other. The fastening portion 54 of the connection member 52 for electrically connecting the rotating electrical machine MG and the inverter device INV is disposed in the device housing chamber 5. As shown in FIG. 2, terminals on the rotating electrical machine MG side (rotating electrical machine-side busbars 53) and terminals on the inverter device INV side (inverter-side busbars 51) are fastened in the fastening portion 54 by busbar fastening members 55 extending in the axial direction L, and are thus electrically connected to each other.

The partition member 13 is disposed so as not to overlap the fastening portion 54 in the axial direction L. In other words, the partition member 13 is disposed so as not to overlap the fastening portion 54 in the axial direction L in the state in which the connection member 52 is fastened in the fastening portion 54. That is, the partition member 13 is disposed so as not to overlap the fastening portion 54 as viewed in the axial direction along the axial direction L. In the present embodiment, the partition member 13 is located inside the device housing chamber 5. Alternatively, it can also be said that the partition member 13 is located outside the rotating electrical machine MG in the radial direction R. In the present embodiment, it can also be said that the partition member 13 is located outside the differential gear mechanism DF in the radial direction R. As used herein, regarding the arrangement of two members, the expression "overlap as viewed in a specific direction" means that, when an imaginary straight line parallel to the viewing direction is moved in all directions orthogonal to the imaginary straight line, there is an area where the imaginary straight line intersects with both of the two members.

As described above, the partition member 13 is disposed so as not to overlap the fastening portion 54 as viewed in the axial direction. Therefore, the fastening portion 54 located inside the device housing chamber 5 is visible from the opening side (axial second side L2) of the case body 11, and it is easy to check the state of the fastening portion 54. It is also easy to carry out the work for fastening the connection member 52 in the fastening portion 54. Although the case body 11 has an opening only on one side in the axial direction L, the productivity and ease of maintenance will not be reduced.

It should be noted that the form in which the partition member 13 is disposed so as to overlap the fastening portion 54 as viewed in the axial direction L is not excluded. For example, the partition member 13 may have an opening (e.g., an opening called a service hole) at a position overlapping the fastening portion 54 as viewed in the axial direction L, so that fastening work in the fastening portion 54 can be done from the axial second side L2 through the opening. Alternatively, the fastening portion 54 may be provided on the axial first side L1 and the case body 11 may have an opening serving as a service hole in the axial wall 62, so that the fastening work in the fastening portion 54 can be done from the axial first side L1. When such an opening (service hole) is provided, it is suitable to provide a lid member that closes the opening.

The busbar fastening members 55 are inserted from the axial second side L2, and are placed in such a direction that the busbar fastening members 55 are fastened to the fastening portion 54 of the connection member 52 such that heads of the busbar fastening members 55 are located on the axial second side L2. As described above, the case body 11 is open on the axial second side L2. The partition member 13 located on the axial second side L2 with respect to the fastening portion 54 does not overlap the busbar fastening members 55 (fastening portion 54) in the axial direction L. That is, the partition member 13 does not overlap the busbar fastening members 55 (fastening portion 54) as viewed in the axial direction along the axial direction L. Therefore, the inverter device INV and the rotating electrical machine MG can be easily electrically connected by the busbar fastening members 55 from the axial second side L2 before attaching the cover member 12 to the case body 11.

In the present embodiment, the terminals of the inverter device INV (inverter-side busbars 51) are disposed on the axial first side L1 of the inverter device INV in the axial direction L, and the terminals connected to the stator coil 83 of the rotating electrical machine MG (rotating electrical machine-side busbars 53) are disposed on the axial first side L1 of the rotating electrical machine MG in the axial direction L. More specifically, the terminals of the inverter device INV (inverter-side busbars 51) are disposed on the axial first side L1 with respect to the stator core 81*c* of the rotating electrical machine MG, and the terminals connected to the stator coil 83 of the rotating electrical machine MG (rotating electrical machine-side busbars 53) are disposed on the axial first side L1 with respect to the stator core 81*c*.

In the present embodiment, both the terminals of the inverter device INV (inverter-side busbars 51) and the terminals connected to the stator coil 83 of the rotating electrical machine MG (rotating electrical machine-side busbars 53) are disposed on the same side in the axial direction L, in this example, the axial first side L1, with respect to the stator core 81*c*. Therefore, both can be electrically connected with a short wiring distance.

It should be understood that there are cases where the inverter-side busbars 51 are disposed on the axial second side L2 with respect to the stator core 81*c*. In such cases, it is suitable that both the inverter-side busbars 51 and the rotating electrical machine-side busbars 53 be disposed on the axial second side L2 with respect to the stator core 81*c*. However, the form in which the inverter-side busbars 51 and the rotating electrical machine-side busbars 53 are disposed on different sides in the axial direction L from each other with respect to the stator core 81*c*, rather than being disposed on the same side in the axial direction L with respect to the stator core 81*c* as in the above examples, is not excluded. For example, the inverter-side busbars 51 may be disposed on the axial first side L1 with respect to the stator core 81*c*, and the rotating electrical machine-side busbars 53 may be disposed on the axial second side L2 with respect to the stator core 81*c*. Alternatively, the inverter-side busbars 51 may be disposed on the axial second side L2 with respect to the stator core 81*c*, and the rotating electrical machine-side busbars 53 may be disposed on the axial first side L1 with respect to the stator core 81*c*. This increases the wiring distance. However, such a configuration may be used when an increase in impedance due to the longer wiring distance is acceptable.

The portion of the case body 11 that forms the inverter housing chamber 3 includes an overhang portion 19 that protrudes beyond the joint surface 9 between the case body 11 and the cover member 12 toward the cover member 12 in the axial direction L and that is separated from the joint surface 9 in a direction orthogonal to the axial direction L (up-down direction V, radial direction R). In other words, the overhang portion 19 extends across the joint surface 9 in the axial direction L, and overlaps the joint surface 9 as viewed in the radial direction R.

Since the case body 11 has the overhang portion 19 as described above, the inverter housing chamber 3 (second housing chamber) can be provided that extends to a position on the axial second side L2 with respect to the joint surface 9 between the case body 11 and the cover member 12. It is therefore easy to ensure the capacity of the inverter housing chamber 3. It should be understood that, when it is possible to form a sufficiently large inverter housing chamber 3, the case body 11 need not necessarily have such an overhang portion 19 as described above.

As described above, the plurality of gears G includes: the input gear G1 as the first gear drivingly connected to the rotor 82 of the rotating electrical machine MG so as to rotate with the rotor 82; and the differential input gear G4 as the second gear connected to the differential gear mechanism DF to transmit the driving force from the rotating electrical machine MG to the differential gear mechanism DF. The rotating electrical machine MG and the input gear G1 are located on the first axis A1, and the differential gear mechanism DF and the differential input gear G4 are located on the second axis A2 that is an axis different from and parallel to the first axis A1. Moreover, the counter gear mechanism CG located on the third axis A3 parallel to the first axis A1 and the second axis A2 includes: the counter driven gear G2 as the third gear that meshes with the input gear G1; and the counter drive gear G3 as the fourth gear that rotates with the counter driven gear G2 and meshes with the differential input gear G4. As shown in FIG. 1, the space in the axial direction L where the partition wall 70 is placed is located so as to overlap the entire space in the axial direction L where the rotating electrical machine MG is placed and to overlap both of the space in the axial direction L where the input gear G1 is placed and the space in the axial direction L where the differential input gear G4 is placed.

Since a large space is secured in the axial direction L for placing the partition wall 70, the inverter housing chamber 3 can be formed over a large area in the axial direction L. This makes it easier to ensure the capacity of the inverter housing chamber 3 in the axial direction L, which reduces the need to increase the size of the inverter housing chamber 3 in a direction orthogonal to the axial direction L (e.g., the up-down direction V). This can reduce an increase in size of the vehicle drive device 100 in the direction orthogonal to the axial direction L.

The present disclosure is not limited to the above forms. The space in the axial direction L where the partition wall 70 is placed may be located so as to overlap part of the space in the axial direction L where the rotating electrical machine MG is placed, rather than being located so as to overlap the entire space in the axial direction L where the rotating electrical machine MG is placed. The space in the axial direction L where the partition wall 70 is placed may be located so as to overlap either the space in the axial direction L where the input gear G1 is placed or the space in the axial direction L where the differential input gear G4 is placed, rather than being located so as to overlap both of these spaces.

As described above, in the present embodiment, the third axis A3 on which the counter gear mechanism CG is disposed is located, in the up-down direction V, below (on the second side V2 in the up-down direction of) the imaginary plane connecting the first axis A1 and the second axis A2. This makes it easier to secure a sufficient space on the upper side in the up-down direction V (first side V1 in the up-down direction), and for example, makes it easier to dispose the connection member 52 that electrically connects the inverter-side busbars 51 and the rotating electrical machine-side busbars 53.

When the third axis A3 on which the counter gear mechanism CG is disposed is located, in the up-down direction V, above (on the first side V1 in the up-down direction of) the imaginary plane connecting the first axis A1 and the second axis A2, it is suitable that the connection member 52 be disposed outside a gear with a relatively small diameter (in this case, the counter drive gear G3) in the radial direction R.

Other Embodiments

Hereinafter, other embodiments will be described. The configuration of each embodiment described below is not limited to that used alone, and can be used in combination with the configurations of other embodiments as long as there is no contradiction.

(1) The above description illustrates the three-axis vehicle drive device 100 in which the rotating electrical machine MG is located on the first axis A1, the differential gear mechanism DF is located on the second axis A2, and the counter gear mechanism CG is located on the third axis A3. However, the vehicle drive device 100 may be structured so that the rotating electrical machine MG, the differential gear mechanism DF, and the counter gear mechanism CG are arranged coaxially. The vehicle drive device 100 may have two axes that are the first axis A1 and the second axis A2 parallel to each other. The vehicle drive device 100 may be structured to further have one or more axes different from and parallel to the first axis A1, the second axis A2, and the third axis A3, namely may be structured to have four or more axes parallel to each other.

(2) The above description illustrates the vehicle drive device 100 for a battery electric vehicle including the rotating electrical machine MG as a driving force source for the wheels W. However, the vehicle drive device 100 may be a hybrid drive device including both an internal combustion engine and the rotating electrical machine MG as driving force sources for the wheels W of the vehicle (various types of hybrid drive devices such as so-called one-motor parallel and two-motor split hybrid drive devices).

Overview of Embodiments

Hereinafter, an overview of the vehicle drive device (100) described above will be provided.

As one aspect, a vehicle drive device (100) includes:

a rotating electrical machine (MG);

a plurality of gears (G) located in a power transmission path from the rotating electrical machine (MG);

a differential gear mechanism (DF) that distributes a driving force transmitted from the rotating electrical machine (MG) via the plurality of gears (G) to a plurality of wheels (W);

an inverter device (INV) that drives and controls the rotating electrical machine (MG); and a case (1).

With an axial direction (L) being a direction along a rotation axis of the rotating electrical machine (MG), the case (1) includes a case body (11) that forms a first housing chamber (5) housing the rotating electrical machine (MG) and the plurality of gears (G) and a second housing chamber (3) housing the inverter device (INV), and a cover member (12) joined to the case body (11) in the axial direction (L) to close the first housing chamber (11), and with an axial first side (L1) being a side in the axial direction (L) on which the rotating electrical machine (MG) is located with respect to the plurality of gears (G), and an axial second side (L2) being an opposite side to the axial first side (L1), the cover member (12) is bonded to the axial second side (L2) of the case body (11) and located so as to cover the axial second side (L2) of the first housing chamber (11), and the case body (11) includes a partition wall (70) that separates the first housing chamber (5) and the second housing chamber (3), a peripheral wall (61) that covers the first housing chamber (5) from outside in a radial direction, and an axial wall (62) that covers the axial first side (L1) of the first housing chamber (5), and the partition wall (70), the peripheral wall (61), and the axial wall (62) are integrally formed.

According to this configuration, since a joint surface (9) between the case body (11) and the cover member (12) is located only on one side in the axial direction (L), it is easier to form the second housing chamber (3) that is large in the axial direction (L). It is therefore easier to secure a large space in the axial direction (L) for placing the inverter device (INV). This reduces an increase in size of the second housing chamber (3) in a direction orthogonal to the axial direction (L) (e.g., up-down direction), and thus reduces an increase in size of the vehicle drive device (100). Moreover, the case body (11) that forms the first housing chamber (5) and the second housing chamber (3) is integrally formed, and the first housing chamber (5) can be formed by the case body (11) and the cover member (12). Therefore, the number of components constituting the case (1) can be reduced. That is, according to this configuration, it is possible to reduce the size and manufacturing cost of the vehicle drive device (100).

It is suitable that the first housing chamber (5) include a rotating electrical machine housing chamber (2) that houses the rotating electrical machine (MG) and a gear housing chamber (4) that houses the plurality of gears (G), and that the case (1) include a partition member (13) located between the rotating electrical machine housing chamber (2) and the gear housing chamber (4) in the axial direction (L) and fixed to the case body (11).

With the partition member (13), the plurality of housing chambers is appropriately formed in the integrally formed case body (11).

It is suitable that the rotating electrical machine (MG) include a rotor (82), and that the rotor (82) be supported by the axial wall (62) and the partition member (13).

According to this configuration, the rotor (82) is appropriately supported by the strong support walls constituting the case 1 (1) (axial wall (62) and partition member (13)).

It is suitable that the rotating electrical machine (MG) include a rotor (82), and that an end (70*t*) of the partition wall (70) on the axial first side (L1) be located closer to the axial first side (L1) than an end of the rotor (82) on the axial first side (L1).

According to this configuration, it is possible to form the inverter housing chamber (3) that is large in the axial direction (L), and it is therefore easy to secure a space in the axial direction (L) for placing the inverter device (INV).

It is suitable that the rotating electrical machine (MG) include a stator (81), and that the end (70*t*) of the partition wall (70) on the axial first side (L1) be closer to the axial first side (L1) than an end of the rotor (82) on the axial first side (L1).

According to this configuration, it is possible to form the inverter housing chamber (3) that is large in the axial direction (L), and it is therefore easy to secure a space in the axial direction (L) for placing the inverter device (INV).

It is suitable that a space in the axial direction (L) where the partition wall (70) is placed be located so as to overlap a space in the axial direction (L) where the partition member (13) is placed.

That is, the partition wall (70) extends across the partition member (13) in the axial direction (L). Since the partition wall (70) extends across the partition member (13) in the axial direction (L), it is easy to ensure the rigidity of the first housing chamber (5), the rigidity of the second housing chamber (3), and the rigidity of the partition wall (70).

In the case where the space in the axial direction (L) where the partition wall (70) is placed is located so as to overlap the space in the axial direction (L) where the partition member (13) is placed, it is suitable that the space in the axial direction (L) where the partition wall (70) is placed be located so as to overlap a space in the axial direction (L) where at least part of the plurality of gears (G) is placed.

By placing the partition wall (70) in this manner, the second housing chamber (3) can be formed over a large area in the axial direction (L). That is, since the partition wall (70) is also located above the gear housing chamber (4), it is possible to form the second housing chamber (3) that is sufficiently large in the axial direction (L). It should be understood that, when it is possible to form a sufficiently large second housing chamber (3), the space in the axial direction (L) where the partition wall (70) is placed need not necessarily overlap the space in the axial direction (L) where the gears (G) are placed.

It is suitable that a fastening portion (54) of a connection member (52) that electrically connects the rotating electrical machine (MG) and the inverter device (INV) be located in the first housing chamber (5), and that the partition member (13) be located so as not to overlap the fastening portion (54) as viewed in an axial direction along the axial direction (L).

Since the partition member (13) is thus located so as not to overlap the fastening portion (54) as viewed in the axial direction, the fastening portion (54) located inside the first housing chamber (5) is visible from the opening side (axial second side (L2)) of the case body (11). It is therefore easy to check the state of the fastening portion (54). It is also easy to carry out the work for fastening the connection member (52) in the fastening portion (54). Although the case body (11) has an opening only on one side in the axial direction (L), the productivity and ease of maintenance will not be reduced.

It is suitable that the connection member (52) be fastened with a fastening member (55), and that the fastening member (55) be inserted from the axial second side (L2) and be placed in such a direction that a head of the fastening member (55) is located on the axial second side (L2).

The case body (11) is open on the axial second side (L2) when the cover member (12) to be placed so as to cover the axial second side (L2) of the first housing chamber (5) is not joined to the axial second side (L2) of the case body (11). Moreover, the partition member (13) located on the axial second side (L2) with respect to the fastening portion (54) does not overlap the fastening members (55) (fastening portion (54)) in the axial direction (L). That is, the partition member (13) does not overlap the fastening members (55) (fastening portion (54)) as viewed in the axial direction along the axial direction (L). Therefore, the inverter device (INV) and the rotating electrical machine (MG) can be easily electrically connected by the fastening member (55) from the axial second side (L2) before attaching the cover member (12) to the case body (11).

It is suitable that a terminal (51) of the inverter device (INV) be located on the axial first side (L1) of the inverter device (INV) in the axial direction (L), and that a terminal (53) connected to a stator coil (83) of the rotating electrical machine (MG) be located on the axial first side (L1) of the rotating electrical machine (MG) in the axial direction (L).

That is, both the terminal (51) of the inverter device (INV) and the terminal (53) connected to the stator coil (83) of the rotating electrical machine (MG) are located on the same side in the axial direction (L), in this example, the axial first side (L1), with respect to a stator core (81c). Therefore, both can be electrically connected with a short wiring distance.

It is suitable that a portion of the case body (11) that forms the second housing chamber (3) include an overhang portion (19) that protrudes beyond the joint surface (9) between the case body (11) and the cover member (12) toward the cover member (12) in the axial direction (L) and that is separated from the joint surface (9) in a direction orthogonal to the axial direction (L).

Since the case body (11) has the overhang portion (19) as described above, the second housing chamber (3) can be provided that extends to a position on the axial second side (L2) with respect to the joint surface (9) between the case body (11) and the cover member (12). It is therefore easy to ensure the capacity of the second housing chamber (3).

It is suitable that the plurality of gears (G) include a first gear (G1) drivingly connected to the rotor (82) of the rotating electrical machine (MG) so as to rotate with the rotor (82), and a second gear (G4) connected to the differential gear mechanism (DF) to transmit the driving force from the rotating electrical machine (MG), that the rotating electrical machine (MG) and the first gear (G1) be located on a first axis (A1), that the differential gear mechanism (DF) and the second gear (G4) be located on a second axis (A2) that is an axis different from and parallel to the first axis (A1), that the vehicle drive device (100) further include a counter gear mechanism (CG) including a third gear (G2) that is located on a third axis (A3) parallel to the first axis (A1) and the second axis (A2) and meshes with the first gear (G1), and a fourth gear (G3) that rotates integrally with the third gear (G2) and meshes with the second gear (G4), and that the space in the axial direction (L) where the partition wall (70) is placed be located so as to overlap an entire space in the axial direction (L) where the rotating electrical machine (MG) is placed and to overlap both of a space in the axial direction (L) where the first gear (G1) is placed and a space in the axial direction where the second gear (G4) is placed.

Since a large space is secured in the axial direction (L) for placing the partition wall (70), the second housing chamber (3) can be formed over a large area in the axial direction (L). This makes it easier to ensure the capacity of the second housing chamber (3) in the axial direction (L), which reduces the need to increase the size of the second housing chamber (3) in a direction orthogonal to the axial direction (L). This can reduce an increase in size of the vehicle drive device (100) in the direction orthogonal to the axial direction (L).

DESCRIPTION OF THE REFERENCE NUMERALS

1: Case, 2: Rotating Electrical Machine Housing Chamber, 3: Inverter Housing Chamber (Second Housing Chamber), 4: Gear Housing Chamber, 5: Device Housing Chamber (First Housing Chamber), 9: Joint Surface, 11: Case Body, 12: Cover Member, 13: Partition Member, 19: Overhand Portion, 51: Inverter-Side Busbar (Terminal of Inverter Device), 52: Connection Member, 53: Rotating Electrical Machine-Side Busbar (Terminal Connected to Stator Coil of Rotating Electrical Machine), 54: Fastening Portion, 55: Busbar Fastening Member (Fastening Member), 61: Peripheral Wall, 62: Axial Wall, 70: Partition Wall, 70t: Axial First Side-End of Partition Wall (End on Axial First Side of Partition Wall), 81: Stator, 82: Rotor, 83: Stator Coil, 100: Vehicle Drive Device, A1: First Axis, A2: Second Axis, A3: Third Axis, CG: Counter Gear Mechanism, DF: Differential Gear Mechanism, G: Gear, G1: Input Gear (First Gear), G2: Counter Driven Gear (Third Gear), G3: Counter Drive Gear (Fourth Gear), G4: Differential Input Gear (Second Gear), INV: Inverter Device, L: Axial Direction, L1: Axial First Side, L2: Axial Second Side, MG: Rotating Electrical Machine, MGt: Axial First Side-End of Rotating Electrical Machine (End on Axial First Side of Rotating Electrical Machine), R: Radial Direction, W: Wheel

The invention claimed is:

1. A vehicle drive device comprising:
a rotating electrical machine;
a plurality of gears located in a power transmission path from the rotating electrical machine;
a differential gear mechanism that distributes a driving force transmitted from the rotating electrical machine via the plurality of gears to a plurality of wheels;
an inverter device that drives and controls the rotating electrical machine; and
a case, wherein
with an axial direction being a direction along a rotation axis of the rotating electrical machine,
the case includes a case body that forms a first housing chamber housing the rotating electrical machine and the plurality of gears and a second housing chamber housing the inverter device, and a cover member joined to the case body in the axial direction to close the first housing chamber, and
with an axial first side being a side in the axial direction on which the rotating electrical machine is located with respect to the plurality of gears, and an axial second side being an opposite side to the axial first side,
the cover member is bonded to the axial second side of the case body and located so as to cover the axial second side of the first housing chamber, and
the case body includes a partition wall that separates the first housing chamber and the second housing chamber, a peripheral wall that covers the first housing chamber from outside in a radial direction, and an axial wall that covers the axial first side of the first housing chamber, and the partition wall, the peripheral wall, and the axial wall are integrally formed as a one-piece unitary structure.

2. The vehicle drive device according to claim 1, wherein:
the first housing chamber includes a rotating electrical machine housing chamber that houses the rotating electrical machine, and a gear housing chamber that houses the plurality of gears; and
the case includes a partition member located between the rotating electrical machine housing chamber and the gear housing chamber in the axial direction and fixed to the case body.

3. The vehicle drive device according to claim 2, wherein:
the rotating electrical machine includes a rotor; and
the rotor is supported by the axial wall and the partition member.

4. The vehicle drive device according to claim 2, wherein:
the rotating electrical machine includes a rotor, and
an end of the partition wall on the axial first side is located closer to the axial first side than an end of the rotor on the axial first side.

5. The vehicle drive device according to claim 2, wherein:
the rotating electrical machine includes a stator, and
the end of the partition wall on the axial first side is closer to the axial first side than an end of the stator on the axial first side.

6. The vehicle drive device according to claim 4, wherein a space in the axial direction where the partition wall is placed is located so as to overlap a space in the axial direction where the partition member is placed.

7. The vehicle drive device according to claim 6, wherein the space in the axial direction where the partition wall is placed is located so as to overlap a space in the axial direction where at least part of the plurality of gears is placed.

8. The vehicle drive device according to claim 2, wherein:
a fastening portion of a connection member that electrically connects the rotating electrical machine and the inverter device is located in the first housing chamber; and
the partition member is located so as not to overlap the fastening portion as viewed in an axial direction along the axial direction.

9. The vehicle drive device according to claim 8, wherein the connection member is fastened with a fastening member, and the fastening member is inserted from the axial second side and is placed in such a direction that a head of the fastening member is located on the axial second side.

10. The vehicle drive device according to claim 1, wherein:
a terminal of the inverter device is located on the axial first side of the inverter device in the axial direction; and
a terminal connected to a stator coil of the rotating electrical machine is located on the axial first side of the rotating electrical machine in the axial direction.

11. The vehicle drive device according to claim 1, wherein a portion of the case body that forms the second housing chamber includes an overhang portion that protrudes beyond a joint surface between the case body and the cover member toward the cover member in the axial direction and that is separated from the joint surface in a direction orthogonal to the axial direction.

12. The vehicle drive device according to claim 1, wherein:
the plurality of gears includes a first gear drivingly connected to the rotor of the rotating electrical machine so as to rotate with the rotor, and a second gear connected to the differential gear mechanism to transmit the driving force from the rotating electrical machine;
the rotating electrical machine and the first gear are located on a first axis;
the differential gear mechanism and the second gear are located on a second axis that is an axis different from and parallel to the first axis;
the vehicle drive device further includes a counter gear mechanism including a third gear that is located on a third axis parallel to the first axis and the second axis and meshes with the first gear, and a fourth gear that rotates integrally with the third gear and meshes with the second gear; and
the space in the axial direction where the partition wall is placed is located so as to overlap an entire space in the axial direction where the rotating electrical machine is placed and to overlap both of a space in the axial direction where the first gear is placed and a space in the axial direction where the second gear is placed.

\* \* \* \* \*